United States Patent
Barbier et al.

(10) Patent No.: US 7,065,780 B2
(45) Date of Patent: Jun. 20, 2006

(54) METHOD AND SYSTEM FOR EMULATING AND HTTP SERVER THROUGH A BROADCAST CAROUSEL

(75) Inventors: Emmanuel Barbier, Paris (FR); Alain Delpuch, Les Essarts le Roi (FR)

(73) Assignee: OpenTV, Inc., San Francisco, CA (US)

( * ) Notice: Subject to any disclaimer, the term of this patent is extended or adjusted under 35 U.S.C. 154(b) by 74 days.

(21) Appl. No.: 10/251,603

(22) Filed: Sep. 20, 2002

(65) Prior Publication Data

US 2004/0060068 A1    Mar. 25, 2004

(51) Int. Cl.
   *H04N 7/173* (2006.01)
(52) U.S. Cl. .................. 725/112; 725/110; 725/131
(58) Field of Classification Search .............. 725/39, 725/40, 41, 42, 43, 44, 46, 47, 48, 49, 51, 725/52, 53, 110, 111, 112, 113, 131
   See application file for complete search history.

(56) References Cited

U.S. PATENT DOCUMENTS

| | | | |
|---|---|---|---|
| 5,666,293 A | 9/1997 | Metz et al. | 395/200.5 |
| 5,805,154 A | 9/1998 | Brown | 345/327 |
| 5,929,850 A | 7/1999 | Broadwin et al. | |
| 6,018,764 A | 1/2000 | Field et al. | 709/217 |
| 6,038,319 A | 3/2000 | Chari | 380/33 |
| 6,164,975 A * | 12/2000 | Weingarden et al. | 434/322 |
| 6,177,930 B1 * | 1/2001 | Chernock et al. | 715/716 |
| 6,185,585 B1 | 2/2001 | Sequeira | 707/513 |
| 6,275,989 B1 | 8/2001 | Broadwin et al. | 725/37 |
| 6,317,885 B1 * | 11/2001 | Fries | 725/109 |
| 6,427,238 B1 | 7/2002 | Goodman et al. | |
| 6,446,262 B1 * | 9/2002 | Malaure et al. | 725/141 |
| 6,459,427 B1 | 10/2002 | Mao et al. | |
| 6,538,701 B1 * | 3/2003 | Yuen | 348/564 |
| 6,622,004 B1 * | 9/2003 | Sonoda et al. | 455/3.05 |
| 6,631,523 B1 * | 10/2003 | Matthews et al. | 725/53 |
| 6,658,661 B1 * | 12/2003 | Arsenault et al. | 725/54 |
| 6,675,385 B1 * | 1/2004 | Wang | 725/39 |
| 6,778,222 B1 * | 8/2004 | Hirai et al. | 348/461 |
| 6,785,902 B1 * | 8/2004 | Zigmond et al. | 725/38 |

FOREIGN PATENT DOCUMENTS

WO     WO 00/62547     10/2000

\* cited by examiner

*Primary Examiner*—Vivek Srivastava
(74) *Attorney, Agent, or Firm*—Meyertons Hood Kivlin Kowert & Goetzel, P.C.; Rory D. Rankin

(57) ABSTRACT

In an interactive television system, an interactive television receiver can receives a carousel over a broadcast path. The broadcast server may run a carousel manager, and the carousel manager may formulate a broadcast policy to be used in constructing the carousel. The interactive television receiver may run a interface module that can process resource requests from an application program. The interface module may obtain a requested resource from the broadcast path or from a point-to-point path.

25 Claims, 9 Drawing Sheets

METHOD AND SYSTEM FOR EMULATING AND HTTP SERVER THROUGH A BROADCAST CAROUSEL

FIELD OF THE INVENTION

This invention relates generally to the field of interactive television. More specifically, it relates to a method and system for sending and receiving resources in an interactive television system.

BACKGROUND OF THE INVENTION

In a broadcast environment, such as interactive television, a broadcast server generally defines a set of resources to be broadcast over a broadcast path. The broadcast path is typically unidirectional, and the resources are broadcast to one or more receivers. An interactive television receiver ordinarily connects to a television or other display device, which can ultimately display the resources to a user. The receiver may also communicate with the broadcast server or with other devices using a point-to-point path, and the point-to-point path may be used to retrieve resources that are not available on the typically faster broadcast path.

One type of resource that may be used in an interactive television environment is a Hypertext Markup Language ("HTML") resource. HTML applications can be made of a number of resources referenced through unique identifiers, such as a uniform resource locator ("URL") or a uniform resource identifier ("URI"). These identifiers point to resources, such as a server or other computer, on which the HTML application may be stored.

An application can be authored in a scripting language, e.g. HTML and Javascript, and published to a recipient using a HyperText Transfer Protocol ("HTTP") server. A software component, such as a browser can receive the application and display the application's resources. To render an HTML resource, the HTML browser typically establishes a connection with the server indicated by an identifier, such as a URL (for example) and fetches the resource. The communication scheme between the HTML browser and the application server is generally a point-to-point scheme, where the HTML browser establishes a bi-directional connection with the server. This scheme may contrast with the unidirectional broadcast path in an interactive television environment.

One example of an application that Digital TV has made possible is interactive television. In an interactive television service, an HTML browser may operate on a Digital TV device. An application is then rendered onto a display connected to the Digital TV device by establishing a connection with the server publishing the application. Although dedicated for television use, the Digital TV environment based on an HTML browser does not provide many of the advantages of a broadcast environment.

One way to provide HTTP resources in a broadcast environment is by using Unidirectional HyperText Transfer Protocol ("UHTTP"). UHTTP provides a method for broadcasting and locally storing resources. In UHTTP, a UHTTP server feeds the recipient's local cache by sending data until the cache fills or until all the data has been sent. A drawback of UHTTP is that the amount of data that can be transmitted to a recipient is limited to the recipient's local storage capabilities. Many interactive television receivers currently in use have a limited memory capacity. The local caching strategy used by UHTTP for handling HTTP resources can therefore disadvantageously limit the efficiency of low-memory interactive television receivers.

In addition, interactive television receivers may request resources via, either point-to-point or broadcast paths. UHTTP systems, however, require that an application use a specific syntax for requests of resources from broadcast paths. The syntax used for requests on the broadcast paths differs from the syntax for requests of resources on point-to-point paths. This difference in syntax may result in an interactive television receiver requesting a resource over the broadcast path that is not available on the broadcast path.

Therefore, there exists a need for a new and improved system and method for sending and receiving resources in an interactive television environment.

SUMMARY

In one aspect of the present invention, a method is provided for processing resource requests in an interactive television system. A interface module may run on an interactive television receiver. The interface module may receive a request for a resource from an application program. The interface module may determine whether the resource is available on a broadcast path or a point-to-point path, and it may convert the request received from the application program into a format used by either the broadcast path or the point-to-point path. The interface module may obtain the resource from the broadcast path or the point to point-to-point path, and it may provide the resource to the application program.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF EXEMPLARY EMBODIMENTS

Interactive Television Architecture

Interactive television provides a way to transmit interactive content to a television. Interactive television systems can provide text, audio, video, hypertext transfer protocol ("HTTP") resources, or other content to a television, and they can also receive input from a television user.

Figure 1:
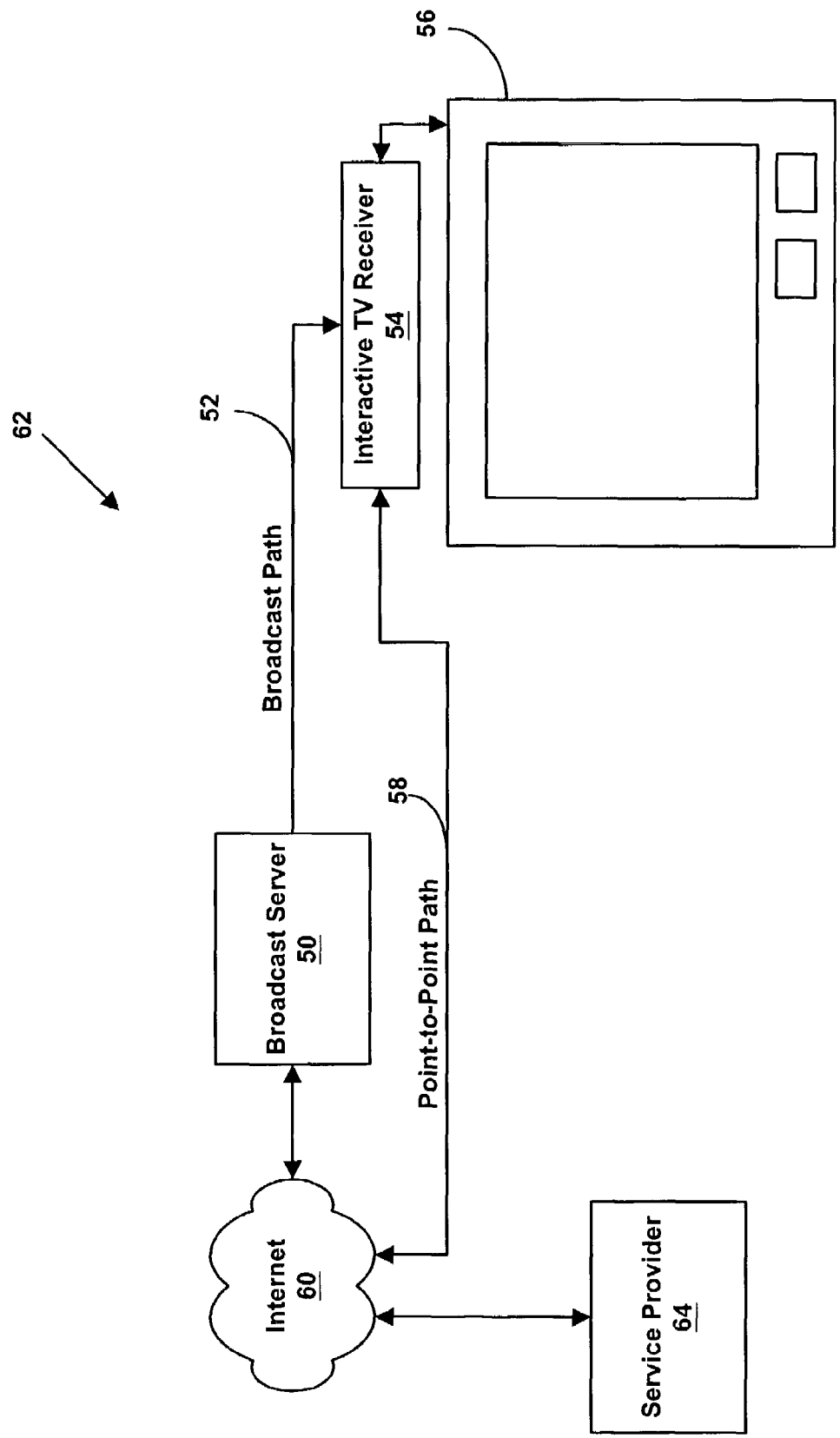
FIG. 1 is an exemplary architecture for an interactive television system.

FIG. 1 depicts an exemplary architecture for an interactive television system 62. A broadcast server 50 sends information along a broadcast path 52 to an interactive television receiver 54. The broadcast server 50 may be any computer or other type of server capable of sending information along a data link. The broadcast server 50 preferably contains a processor and memory. The processor executes programs, which may be stored in memory. Additionally, the memory contains content to be broadcast along the broadcast path 52 to the interactive television receiver 54.

The broadcast path 52 can be any type of data link and can carry data in a variety of different formats. In a preferred embodiment, the broadcast path 52 is a cable television transmission path used to transmit cable television signals from a cable television provider to a television 56. The data transmitted along the broadcast path 52 may use the same signaling protocols that are used for transmission of cable television signals along the path.

In another embodiment, the broadcast path 52 comprises a wireless direct satellite transmission system. A signal is sent wirelessly by a satellite to a satellite dish, or other receiver, linked to the television 56. Once received by the satellite dish, the signal may travel through a data link to the television 56 or to the interactive television receiver 54. In yet another embodiment, the broadcast path 52 may be part of a wireless telecommunications network. For example, one or more terrestrial antennas may be used to send signals over the broadcast path to the television. Of course, it may also be possible to use combinations of wireless and wired transmission methods for sending data on the broadcast path 52.

The interactive television receiver 54 connects to the broadcast path 52 of an interactive television system, and it receives interactive television signals sent along the broadcast path 52. The interactive television receiver 54 ordinarily contains a processor and memory. The interactive television receiver 54 is capable of executing programs stored in its memory, and it is capable of executing programs received along the broadcast path 52 from the broadcast server 50. In a preferred embodiment, the interactive television receiver 54 includes a set-top box of a type that is well-known in the art, connected to the television 56. However, another device connected to the television 56, such as a computer, a game console, or another programmable device, can function as the interactive television receiver 54. While the interactive television receiver 54 is illustrated as a separate component from the television 56, in an alternative embodiment all or part of the functionality of the interactive television receiver 54 may be integrated into the television 56. In yet another embodiment, the functionality of the interactive television receiver 54 may be distributed across more than one component connected to the television 56.

The interactive television receiver 54 connects to the television 56 and provides an interface between the broadcast server 50 and the television 56. The interactive television receiver 54, for instance, may pass cable television signals straight through to the television 56, which would allow the ordinary viewing of cable television signals. The interactive television receiver 54, however, may receive and process interactive television signals sent from the broadcast server 50.

The interactive television receiver 54, for instance, may convert the interactive television signals into a format understood by the television 56. For example, the interactive television signals sent from the broadcast server 50 may need to be decompressed or decoded. The interactive television receiver 54 can perform decoding and decompression to recover the original signals, and it may perform other processing on these signals. The interactive television receiver 54 sends the interactive television content that has been converted into a proper format for display, to the television 56 for display. A user may then view the interactive television content displayed on the television 56.

The interactive television receiver 54 may additionally contain input devices. For example, it may contain a keyboard, mouse or other devices to allow a user to interact with the television 56 and the interactive television receiver 54. By using the input devices, the user may, for example, respond to data displayed on the television 56. The user's selections can be used to interactively drive the content displayed on the television 56, thus providing an interactive television system.

In one example, the interactive television system provides a web-browsing session to a user. The interactive television receiver 54 connects to the Internet 60 through the broadcast server 50, and the interactive television receiver 54 runs an appropriate browser. The interactive television receiver 54 receives Internet content from the Internet 60 via the broadcast server 50. The interactive television receiver 54 then uses the browser to display the Internet content on the television 56. A user can use the keyboard, mouse or other input device, to browse to different web pages or links, thereby interacting with the television 56.

In an interactive television system the broadcast path 52 is typically unidirectional, although bi-directional broadcast paths may be used in interactive television systems. The broadcast path 52 may be the same path used for providing cable television services, and cable television services are generally unidirectional. In a cable television system, signals are sent from a cable television server to the television 56. During transmission from the cable television server to the television 56, the cable television signals may pass through routers, repeaters or other network devices. Since a cable television system does not require return information from the television 56, the networks elements are ordinarily configured to only support unidirectional communication. Therefore, data cannot be sent "back" through the cable television lines to the broadcast server 50.

Signals in a direct satellite transmission system are transmitted from a transmission tower to a satellite and then ultimately received by a satellite dish, or other device, connected to a television 56. The satellite dish is also generally equipped to only receive signals from the satellite and not to transmit signals to the satellite. Likewise, the satellite is not configured to receive signals transmitted from various subscribers.

In order to enable bi-directional communication in an interactive television system 62, the interactive television receiver 54 uses a point-to-point path 58, also called a return path. The point-to-point path 58 is typically different from the broadcast path 52. The point-to-point path 58 can be any number of data links, but ordinarily the point-to-point path 58 is a phone line, cable modem or other bi-directional link. The point-to-point path 58 could also be a wireless link, such as an interface with a cellular network.

The point-to-point path 58 connects with the interactive television receiver 54. As depicted in FIG. 1, the point-to-point path 58 connects to the Internet 60. This may be done, for instance, by connecting to an Internet Service Provider ("ISP") through a phone line. The ISP may in turn provide connectivity to the Internet 60. Once connected to the Internet 60, the interactive television receiver 54 can access other devices also connected to the Internet 60. For example, the interactive television receiver 54 can communicate with a service provider 64 connected to the Internet 60. The interactive television receiver 54 may send a message via the point-to-point path 58 to the Internet 60, where the message is ultimately routed to the service provider 64.

Likewise, the interactive television receiver 54 can communicate with the broadcast server 50 via the Internet 60 or via another network connected, thus forming a bi-directional communication link between the broadcast server 50 and the interactive television receiver 54. The broadcast server 50 preferably sends information to the interactive television receiver 54 via the broadcast path 52, because the broadcast path is ordinarily faster than the point-to-point path 58. The interactive television receiver 54 can send information to the broadcast server 50 using the point-to-point path 58.

While FIG. 1 illustrates the point-to-point path 58 connecting to the Internet 60, it may also connect to another network or directly to the broadcast server 50. Then, the interactive television receiver 54 can communicate with the other devices linked to the interactive television receiver 54 via the point-to-point path 58. In another embodiment, the point-to-point path 58 may be the same as the broadcast path 52.

Broadcast Carousels

The broadcast server 50 may send interactive television content to the interactive television receiver 54 via the broadcast path 52 using a data-flow construct hereinafter referred to as a carousel. An interactive television receiver 54 can include memory that can be used to store interactive television content sent from the broadcast server 50; however, the memory in an interactive television receiver 54 may be limited. Therefore, the interactive television receiver 54 may not be able to store in its memory an entire interactive television application or an entire piece of interactive television content. The broadcast server 50 may nevertheless send the interactive television content despite the limited memory in the interactive television receiver 54 by using a carousel.

The carousel may be implemented as a stream of data partitioned to be transmitted to the interactive television receiver 54 in regular cycles. The cyclic, or periodic, transmission of the data permits the interactive television receiver 54 to retrieve any data not currently in memory within the carousel's cycling time. That is, the interactive television receiver 54 does not need to store an entire program since portions that do not fit in the limited memory are available during the cyclic transmission of the carousel. The interactive television receiver 54 may retrieve, store and display the television content by extracting the portions of data from the carousel.

In one exemplary process for forming a carousel, the broadcast server 50 first determines what data should be sent to the interactive television receiver 54. The data may be an application to be run on the interactive television receiver 54, it may be web pages for a web browsing session or it may be many other types of data or content supported by the interactive television system 62. The broadcast server 50 then divides the data into modules. The modules are generally smaller data portions to be transmitted to the interactive television receiver 54 via the broadcast path 52. In addition to dividing the data into modules, the broadcast server 50 additionally forms a carousel directory 112. The carousel directory 112 includes a listing of the carousel modules. The carousel directory 112 allows an interactive television application to determine what part of the carousel to access in order to obtain the resource. Carousel addresses identify the location of resources in the carousel.

The modules are sent to the interactive television receiver 54, and the interactive television receiver 54 can store the modules for use in the interactive television system 62. Since the available memory in the interactive television receiver 54 can be limited, the modules are continually sent to the interactive television receiver 54 in a rotating fashion. When needed, the interactive television receiver 54 may retrieve a module from the broadcast path, and it may overwrite one or more previously received modules with the more recently received module.

By sending the modules in this manner, the interactive television receiver 54 can store only a portion of the modules at any given time, but still have access to the other modules. When the interactive television receiver 54 needs to access a module that is not in memory, it only has to wait a short time before the module is sent as a part of the continual, rotating carousel transmissions. This can reduce the amount of memory needed in the interactive television receiver 54 to accommodate large applications.

Figure 2:
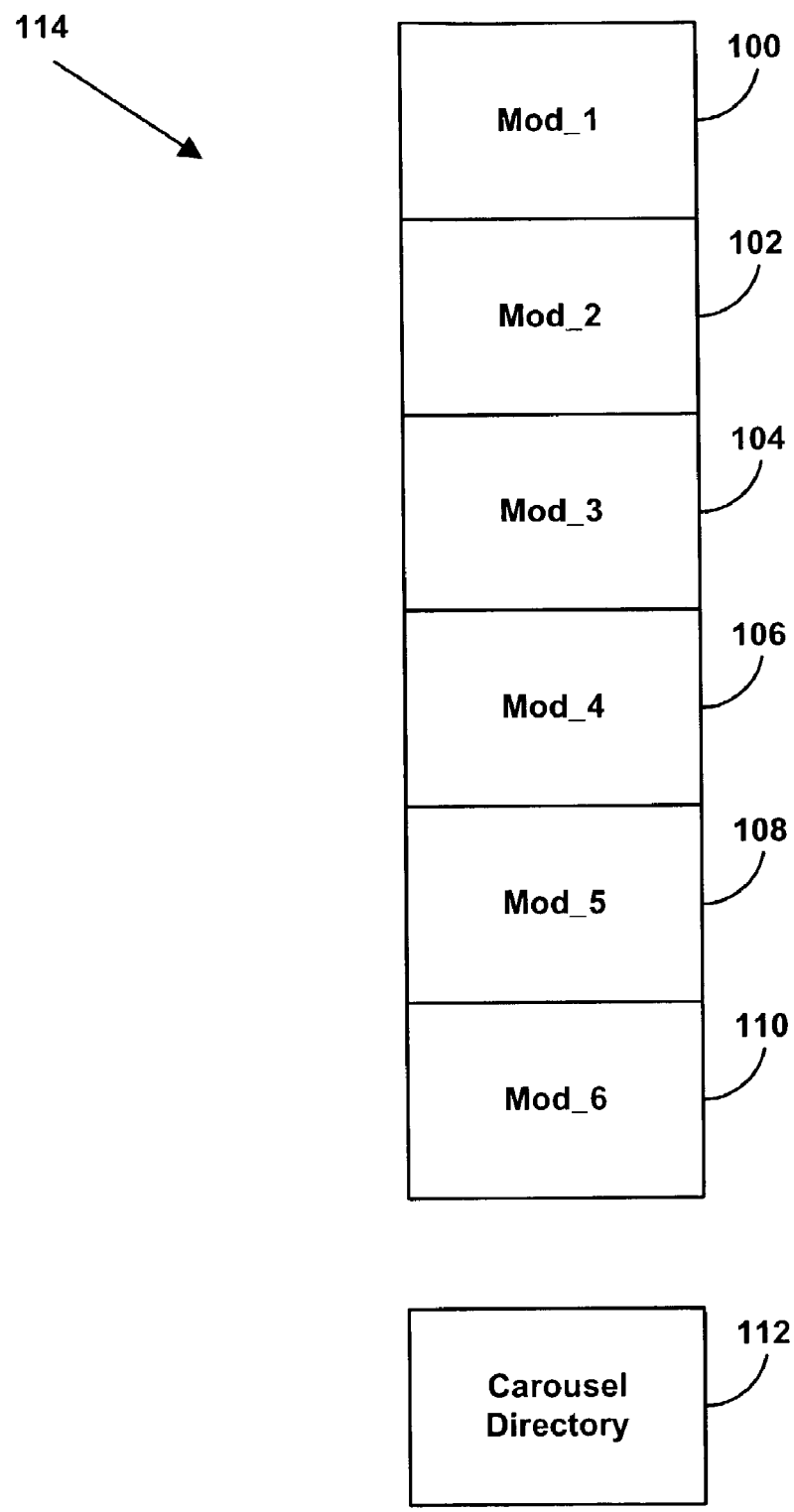
FIG. 2 shows a division of an interactive television application into modules.

FIG. 2 shows an exemplary division of an interactive television application into six modules 100, 102, 104, 106, 108, 110. Each module may include one or more parts of the application. Each module may hold different amounts of information, and, therefore, modules may differ in size. In addition to carrying part of an interactive television application, a module may contain control information, header information, or other data. Of course, an interactive television application may be divided into a fewer or greater number of modules, and an interactive television module may carry one or more complete or partial interactive television applications. In addition to the six data modules 100, 102, 104, 106, 108, 110, a carousel directory 112 is also created. The carousel directory 112 can include a general listing of the division of the interactive television application into the six data modules 100, 102, 104, 106, 108, 110.

Figure 3:
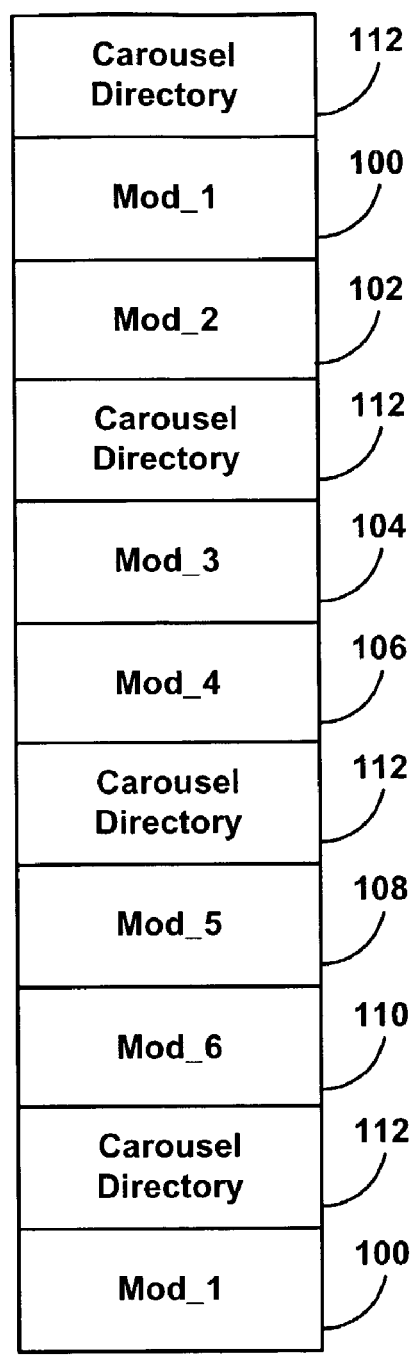
FIG. 3 shows an exemplary order for transmitting the modules of FIG. 2 to an interactive television receiver via a broadcast path.

FIG. 3 shows an exemplary order for transmitting modules in the carousel to the interactive television receiver 54 via the broadcast path 52. First, the carousel directory 112 is transmitted to the interactive television receiver 54. Next, module_1 100 and module_2 102 are transmitted to the interactive television receiver 54. Then, the carousel directory 112 is retransmitted, and module_3 104 and module_4 106 are transmitted. Again, the carousel directory 112 is retransmitted and module_5 108 and module_6 110 are transmitted. Following the transmission of module_6 110, the cycle begins to repeat with the transmission of the carousel directory 112 and module_1 100. The order described in FIG. 3 is merely exemplary in nature, and other transmission orders may also be used.

While the interactive television receiver 54 may have sufficient memory to store all the modules in an interactive television application, often time its memory is limited and it may only be able to store a portion of the carousel modules 100, 102, 104, 106, 108, 110. For instance, an interactive television receiver 54 may receive the carousel described in FIG. 3, and the interactive television receiver 54 may only have enough memory to simultaneously store three modules.

In order to accommodate the limited memory of the interactive television receiver 54, the carousel modules can be continually transmitted to the interactive television receiver 54. When an application running on the interactive television receiver needs a module, it can obtain the module from the carousel. The module can then be stored in memory. Similarly, when the application needs another module, it can obtain the module from the carousel and store the module in its memory. Therefore, the modules can be obtained and stored by the interactive television receiver 54 in the order they are requested by the application.

Eventually, the interactive television receiver 54 may obtain a module from the carousel, however, it may not have sufficient memory to store the newly obtained module. In this case, the interactive television receiver 54 may remove one or more other modules in its memory. For example, the interactive television receiver 54 may remove the oldest module stored in it memory. In another example, the interactive television receiver 54 may remove a module that is no longer need by the application program. In yet another example, the interactive television receiver 54 may use a different criteria to determine which module to remove. Since the modules in the carousel may be different sizes, the interactive television receiver 54 may remove more than one module to make room for the newly obtained module. Once the interactive television receiver 54 may make room for the newly received module, it can be stored in memory and accessed by the application program.

Carousel Manager

Figure 4:
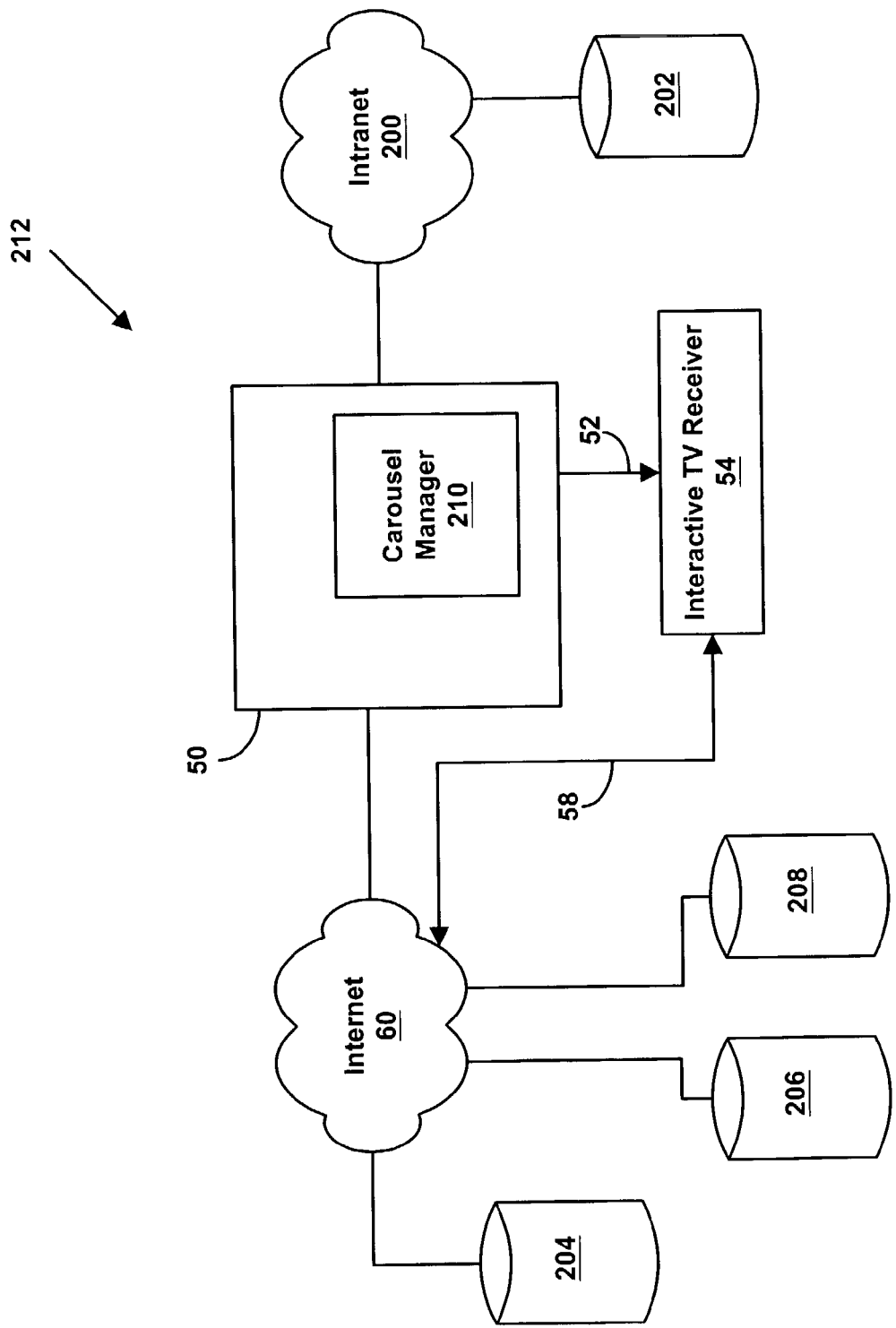
FIG. 4 shows an exemplary interactive television system using a carousel manager.

FIG. 4 shows an exemplary interactive television system using a carousel manager. A carousel can be used to broadcast a service in an interactive television system 212. A service is generally a collection of resources. A resource may be any number of different data objects, such as a data object that can be identified by a uniform resource indicator ("URI") or a uniform resource locator ("URL"). Uniform resource locators are described in more detail in Internet Engineering Task Force Request For Comment 1738, "Uniform Resource Locators (URL)", Berners-Lee et al., December 1994, which is incorporated herein by reference in its entirety. Uniform resource indicators are described in more detail in IETF RFC 2396, which is incorporated by reference herein in its entirety.

For example, a service may be an on-line magazine. The magazine can include a variety of different resources, such as multiple articles. Each article may further include audio files, video files or other content. The articles may be stored on-line, for example, as hypertext markup language ("HTML") pages. Of course, other link language, such as extensible HTML ("XHTML"), website meta language ("WML") may also be used. Other resources may stored using different formats, such as Joint Photographic Experts Group ("JPEG"), Moving Picture Experts Group ("MPEG"), MP3 or any number of other available formats. The resources may be formatted into a page, such as a webpage, which can provide a collection of resources constituting a single coherent space of interaction and display. The page can itself be a resource, and a service may include more than one page.

Figure 5:
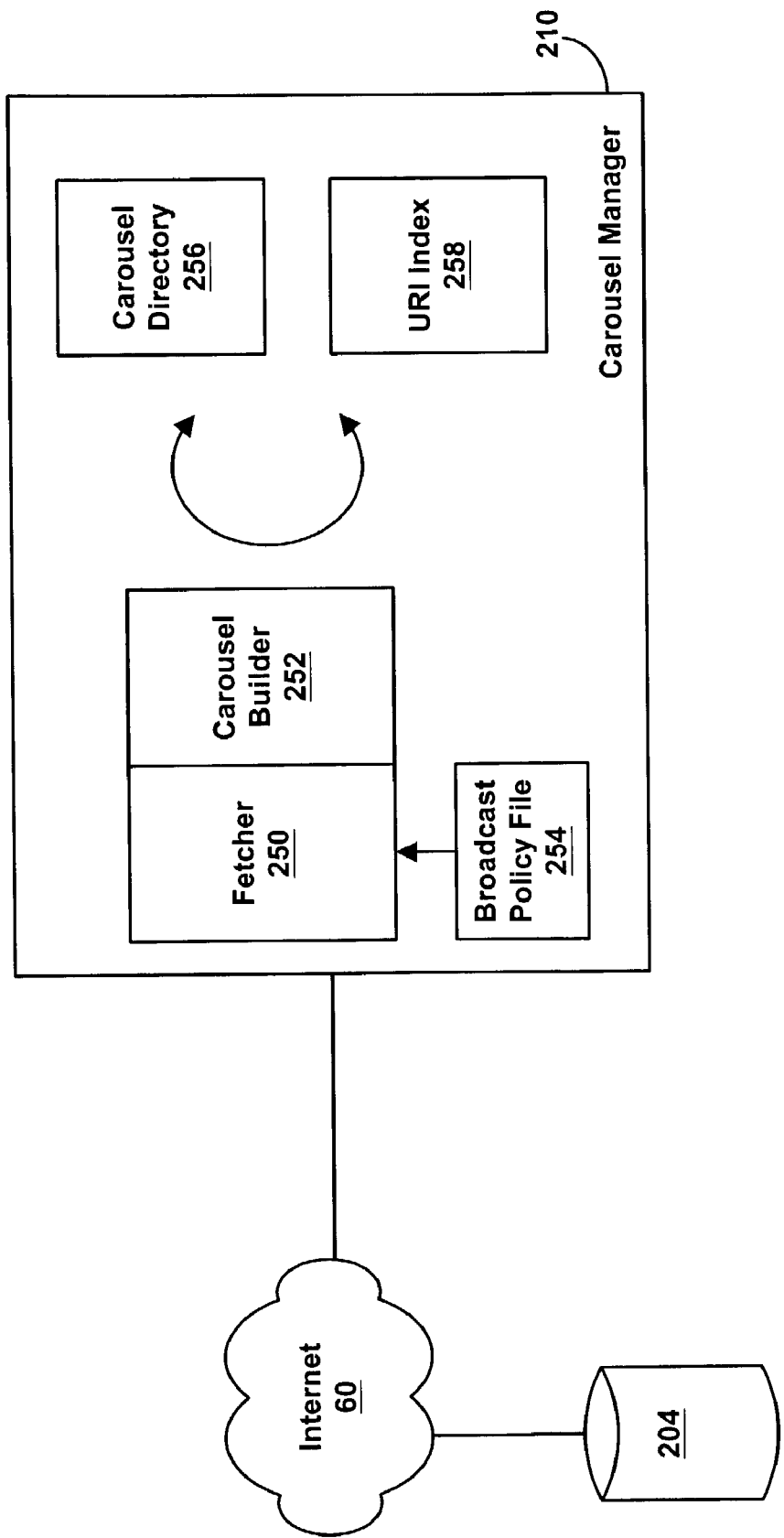
FIG. 5 shows the carousel manager used in the interactive television system of FIG. 4.

A service, such as the on-line magazine, may be accessed from, and sometimes stored by, a service provider 204. The service provider 204 may be connected to the broadcast server 50 through the Internet 60, as shown in FIG. 5. Alternatively, the service provider 204 may be connected to an intranet or other network work that also connects to the broadcast server 50. Multiple service providers 202, 204, 206, 208 can interface with the broadcast server 50 through one or more networks. Additionally, each service provider 202, 204, 206, 208 may store more than one service.

A carousel manager 210 preferably functions on the broadcast server 50. The carousel manager 210 handles generating and broadcasting carousels, which are formed from services available from service providers 202, 204, 206, 208. While the carousel manager 210 may handle services authored using a variety of different formats, in a preferred embodiment the carousel manager 210 handles generating and broadcasting of services authored in HTML FIG. 5 illustrates a more detailed description of the carousel manager 210, which can be use to construct a broadcast carousel. The carousel manager 210 interfaces with a service provider 204 via the Internet 60, although this may be done through another type of network or another type of connection. A fetcher 250 in the carousel manager 210 interfaces with the service provider 204, and it receives a service from a service provider. For example, it can receive the HTTP service from the service provider 204. The service may be, for instance, the on-line magazine authored using HTML. Of course, the fetcher 250 can obtain other non-HTTP services. For example, the fetcher 250 can obtain resources identified by a URI or URL, or it can obtain resources through applications such as the file transfer protocol ("FTP"). The carousel manager 210 can then form the service into a broadcast carousel using a broadcast policy. The broadcast carousel can then be transmitted to the interactive television receiver 54.

Figure 6:
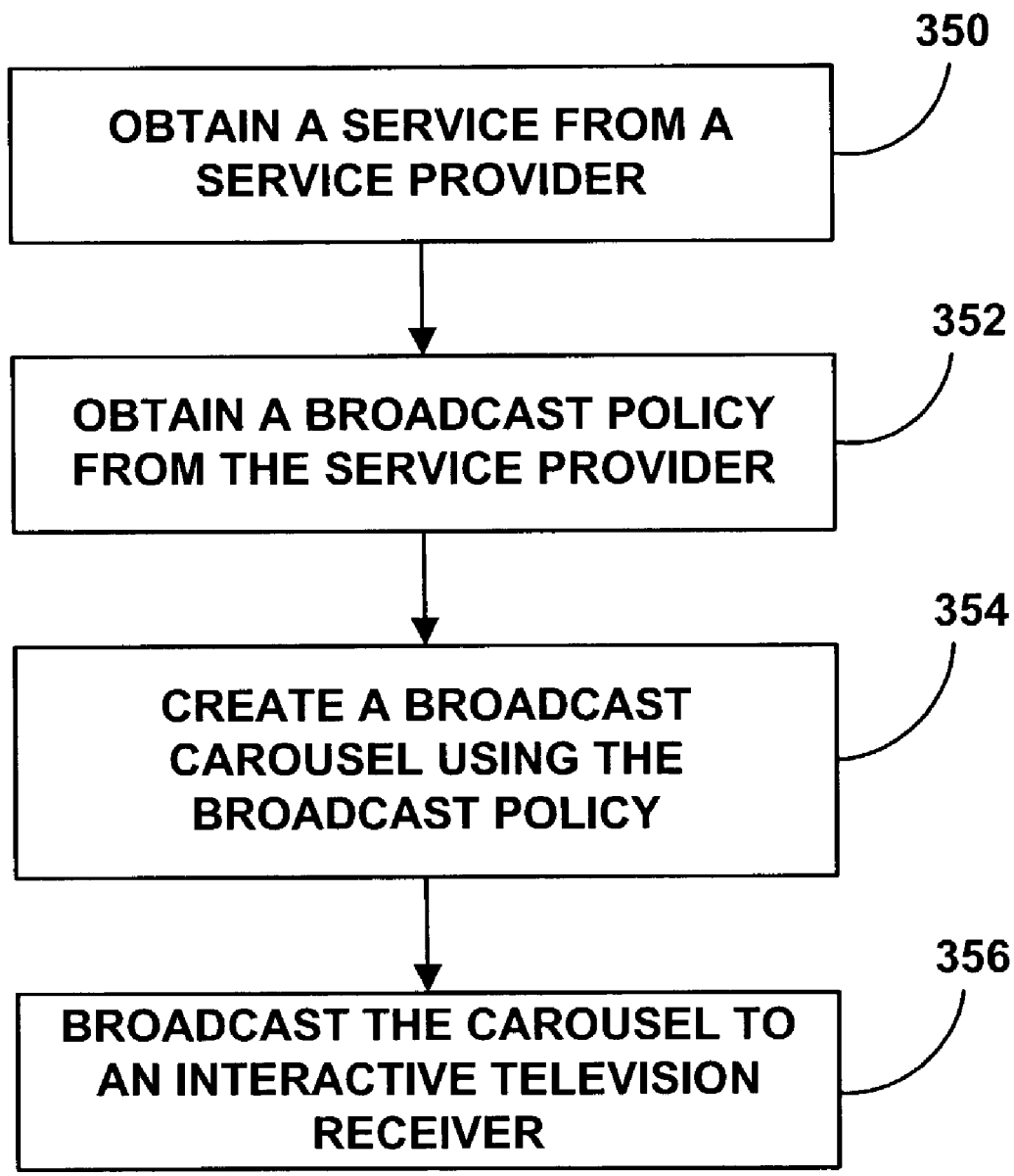
FIG. 6 is a flowchart of an exemplary process for building a broadcast carousel.

FIG. 6 is a flowchart of an exemplary process that may be used to build a broadcast carousel. At Step 350, the carousel manager can obtain a service from a service provider. Then, at Step 352, the carousel manager can obtain a broadcast policy from the service provider. Next, the carousel manager can create a broadcast carousel using the broadcast policy obtained from the service provider, shown at Step 354. Then, the carousel can be broadcast to the interactive television receiver, shown at Step 356.

With continued reference to FIG. 5, the fetcher 250 can also determine a broadcast policy for the service. The broadcast policy generally defines which resources will be broadcast to the interactive television receiver 54 over the broadcast path an which resources will only be available to the interactive television receiver 54 over the point-to-point path 58. Various different factors can be considered in developing the broadcast policy, and the broadcast policy may be formed in a variety of different ways.

The broadcast path 52 generally supports a high bandwidth, and, therefore, it may be able to support sending large amounts of data; however, the interactive television receiver 54 may have limited memory. In order to accommodate the limited storage of the interactive television receiver 54, data is continually sent to the interactive television receiver 54 in the carousel. To obtain data not currently in memory, the interactive television receiver 54 can wait for the carousel to cycle through to the module holding the data. By placing large amounts of data in the carousel to be sent to the interactive television receiver 54, the interactive television receiver 54 may have to wait longer for the carousel to cycle through the modules in order to receive a module that is not currently in its memory. Therefore, it may be desirable to limit the amount data placed in the carousel and sent to the interactive television receiver 54 via the broadcast path 52.

The HTTP fetcher 250 uses the broadcast policy in a variety of different ways. In one exemplary embodiment, the service provider 204 may send the fetcher 250 a broadcast policy to be used in forming the carousel. For instance, the service provider 204 may send the fetcher 250 a channel definition file, which can be used as the broadcast policy. As is known in the art, a channel definition file can be a specific format for identifying a collection of resources. The channel definition file can be created by the service provider 204, and it can be associated with the service. In forming the channel definition file, the service provider 204 may indicate resources that are more likely to be accessed by the interactive television receiver 54. These resources, as defined by the channel definition file, can be placed in the carousel and sent to the interactive television receiver 54 via the broadcast path 52. The lesser-accessed resources, however, may be reserved for the point-to point path 58. The channel definition file is merely exemplary in nature, and other formats may be used to specify the broadcast policy.

Returning to the on-line magazine example, the service provider 204 may specify a channel definition file that identifies certain resources to place in the carousel. These may be, for example, the index of the on-line magazine, the cover story, feature articles or other popular resources. Lesser-viewed resources may be reserved for the point-to-point path 58. By forming the carousel to include commonly accessed resources, the service provider 204 can limit the size of the broadcast carousel. This can increase the speed with which the interactive television receiver 154 can access the carousel's resources. Additionally, a smaller carousel can reduce the strain on the interactive television system than may be caused by continually sending large amounts of data.

In another exemplary embodiment of using the broadcast policy, the carousel manager 210 may store a broadcast policy file 254. The broadcast policy file 254 can be used in conjunction with the broadcast policy provided by the service provider 204 to create the carousel. The fetcher 250 can use the broadcast policy file 254 and the service provider's broadcast policy in a variety of ways.

In one example, the service provider's broadcast policy may specify a list of resources to be placed in the carousel. The broadcast policy file 254, however, may set a maximum limit for the size of the carousel. The size defined by the broadcast policy file 254 may be a maximum number of resources, a maximum number of physical bits used by the resources, or another measure. If the service provider's broadcast policy specifications do not exceed the maximum limit set by the broadcast policy file 254, then the fetcher 250 may simply use the service provider's broadcast policy to create the carousel. However, if the service provider's broadcast policy specifies an amount of resources that exceeds the size limit set by the fetcher's broadcast policy file 254, then the fetcher 250 may further limit the resources placed in the carousel. This may be done using many different methods.

In one example, the service provider's broadcast policy may further define a priority of the resources. The fetcher 250 can then use that priority in determining which resources to place in the carousel. In another example, the fetcher 250 may define a priority for types of resources. For example, HTML pages may receive a higher priority than JPEG files. Therefore, in order to enforce the maximum size limit of the carousel, the fetcher 250 may remove JPEG files from the resources defined by the service provider's broadcast policy. In yet another example, the fetcher 250 may arbitrarily remove content until the maximum size limits are met. Other ways also exist to enforce the maximum size limit, and these may also be used.

The broadcast policy file 254 may specify limitations or restrictions other than a maximum size. For example, the fetcher's broadcast policy file 254 may restrict certain types of resources, such as files. For example, it could specify that no MPEG files are to be placed in the carousel, or it may place similar restrictions on other types of files. Additionally, the broadcast policy file 254 may place restrictions on the size or amounts of certain types of files. Other limitations may also be used.

In another type of priority, the broadcast policy may specify cycle rates for resources in the carousel. For example, the broadcast policy may specify that certain modules should be cycled in the carousel more frequently than other resources. This can allow these modules to be accessed more quickly. Since the modules would be cycled in the carousel more frequently that others, an interactive television receiver would have to wait a shorter amount of time before carousel cycles to the module. Therefore, the wait time for obtaining the module can be reduced.

These examples are not meant to be exhaustive. Many other factors may be considered in creating a broadcast policy. Additionally, many other ways exist for the service provider's broadcast policy and the broadcast policy file 254 to interact, and these may also be used.

In addition to using a broadcast policy, the fetcher 250 can also perform content negotiation. A resource may have multiple representations. The carousel builder 252 may perform content negotiation with the service provider 204 and the interactive television receiver 54 in order to determine a proper resource representation to use in building the carousel. For example, the service provider may specify an HTML page, and that HTML page may have multiple representations corresponding to different versions of HTML that were used to create the page. In another example, an audio or video resource may be available in different formats. Of course, many other representations exist for resources and these may also be used in performing content negotiation.

An interactive television receiver 54 may not be able to support any of the multiple representations. Alternatively, the interactive television receiver 54 may be able to support one or more of the multiple representations. For example, a resource may be an image file. The image file may be stored in multiple representations, such as JPEG and bitmap. The interactive television receiver 54, however, may only support bitmap images. Therefore, the interactive television receiver 54 may not be able to properly display the JPEG representation of the image. By performing content negotiation between the interactive television receiver 54 and with the service provider 204, the carousel builder 252 can select a proper representation for a resource when multiple representations are available. For example, the carousel manager 210 may determine that the resource is available in the JPEG and bitmap representations. Additionally, the carousel manager 210 may determine that the requesting application program supports only bitmap images. Then, the carousel manager 210 can obtain the bitmap representation from the service provider 204 for use in the carousel.

One method for performing content negotiation is specified in the HTTP 1.1 standard. HTTP 1.1 is described in more detail in the Internet Engineering Task Force Request For Comment 2616, "Hypertext Transfer Protocol—HTTP/1.1", Fielding et al., June 1999, which is incorporated herein by reference in its entirety. Of course, other methods may also be used to perform content negotiation.

Once the carousel builder 252 obtains the resources to be placed in the carousel, such as by receiving them from the fetcher 250, the carousel builder 252 can then construct the carousel. This may be done using an appropriately supported carousel format. For example, each resource may be put inside a transport module and inserted in the carousel by the carousel builder 252. For an HTTP resource, for example, the module may preferably include the HTTP resource body and HTTP resource headers. The carousel may be distributed across multiple tracks. As is known in the art, a track can be an elementary broadcast stream.

In addition to building the carousel, the carousel builder 252 can also construct a carousel directory 256. The carousel directory 256 can be sent to the interactive television receiver 54 as a part of the carousel, and it can specify the resources available in the different carousel modules. The carousel directory 256 can specify the resources available in the carousel using a variety of different methods. In an exemplary embodiment, the carousel directory 256 can specify the resources using a carousel addressing scheme. Thus, the carousel directory 256 can provide a mapping between a resource's carousel module address and the resource's physical address. Other ways may also be used to identify resources in the carousel and to identify the module carrying a particular resource.

The carousel builder 252 may also construct a URI index 258. The URI index 258 may be, for example, a data structure holding information about resources in the carousel. The URI index 258 can include a mapping between a resource's carousel address and the resource's URI or other unique identifier. For example, the URI index 258 may provide a mapping between a URI identifying the resource and its location in the carousel. In another example, a resource may be identified using a URL, and the URI index 258 may provide a mapping between the URL and the resource's carousel address. The URI index 258 can be used to provide a mapping between a resource's URI or URL and the resource's carousel address. Then, the carousel directory 256 can be used to further resolve the carousel address into the resource's physical address in the carousel.

Of course, the URI index 258 could also provide a more direct mapping. For example, the URI index 258 could provide a mapping between a resource's URI and the resource's physical address in the carousel. Similarly, the URI index 258 could provide a mapping between a resource's URL, or other identifier, and the resource's physical address in the carousel. Using this direct mapping, a resource identified by a URI, URL or other identifier could be directly resolved to a physical address using the URI index 258. This can eliminate the intermediate step of using the carousel directory 256 to resolve a module address into a physical address.

The carousel provides a set of resources to the interactive television receiver 54. The resources in the carousel may be periodically updated according to the broadcast policy for the carousel. Resources may be added and removed from the carousel, and resources may be updated to provide the interactive television receiver 54 with a more current version of the resource. The changes in the carousel resources may also trigger a corresponding change in the carousel directory 256 and the URI index 258. Both the carousel directory 256 and the URI index 258 can be updated to reflect the changed composition of the carousel.

While it is possible to update both the carousel directory 256 and the URI index 258 to reflect changes in the carousel, a supplemental URI index or supplemental carousel directory can also be used. The supplemental URI index can reflect only the changes to the URI index 258. Similarly, the supplemental carousel directory can reflect only the changes to the carousel directory 256. These smaller updates can then be used in conjunction with the carousel directory 256 and the URI index 258 to reflect the current composition of the carousel.

In one example of updating the resources in the carousel, a resource may be updated or removed from the carousel upon expiration of the resource. The HTTP carousel manager 210 generally broadcasts resources that have been assigned for broadcast by the service provider 204 or by the fetcher 250. The fetcher 250 can also ensure that the carousel uses the most current resources. The service provider 204 can specify expiration information for resources. This may be done through the broadcast policy, such as by making an entry for a particular resource, or the expiration information may be specified in a resource itself. For example, an HTML page can specify expiration information.

In one exemplary embodiment, the fetcher 250 can use the HTTP 1.1 "Server Specified Expiration Model" to prevent resources in the carousel from being obsolete. The fetcher 250 may also use another model for determining expiration times of resources. If the fetcher 250 determines a resource is obsolete, it takes it out of the carousel.

For example, an application running on the interactive television receiver 54 may obtain a resource from the carousel, but the application may want to determine if it has the most current version of the resource. The application may use the carousel directory 256 to compute an age calculation header. The carousel directory 256 may be used to provide a triggering mechanism to provide real-time update information on the resources held by the carousel, thereby determining if the application has the current version of the resource has held by the carousel.

In addition to providing an interactive television receiver application with the most current version of the resources, the resource expirations can be used to maintain the resources in the carousel. When a resource expires, the fetcher 250 may obtain a more current version of the resource from the service provider 204. The fetcher 250 may provide the updated resource to the carousel builder 252, which then replaces the obsolete version of the resource in the carousel with the updated version. Then, as the carousel is transmitted, the interactive television receiver 54 receives the updated resource. In an alternate embodiment, the updated resource is not placed in the carousel. The interactive television receiver 54 can only obtain the updated resource from the point-to-point path 58.

If a more current version of the resource is not available, then the fetcher 250 may instruct the carousel builder 252 to remove the resource from the carousel. The carousel builder 252 may then accordingly update the URI index 258. The resource may then no longer be available over the broadcast path 52.

Interface Module

Figure 7:
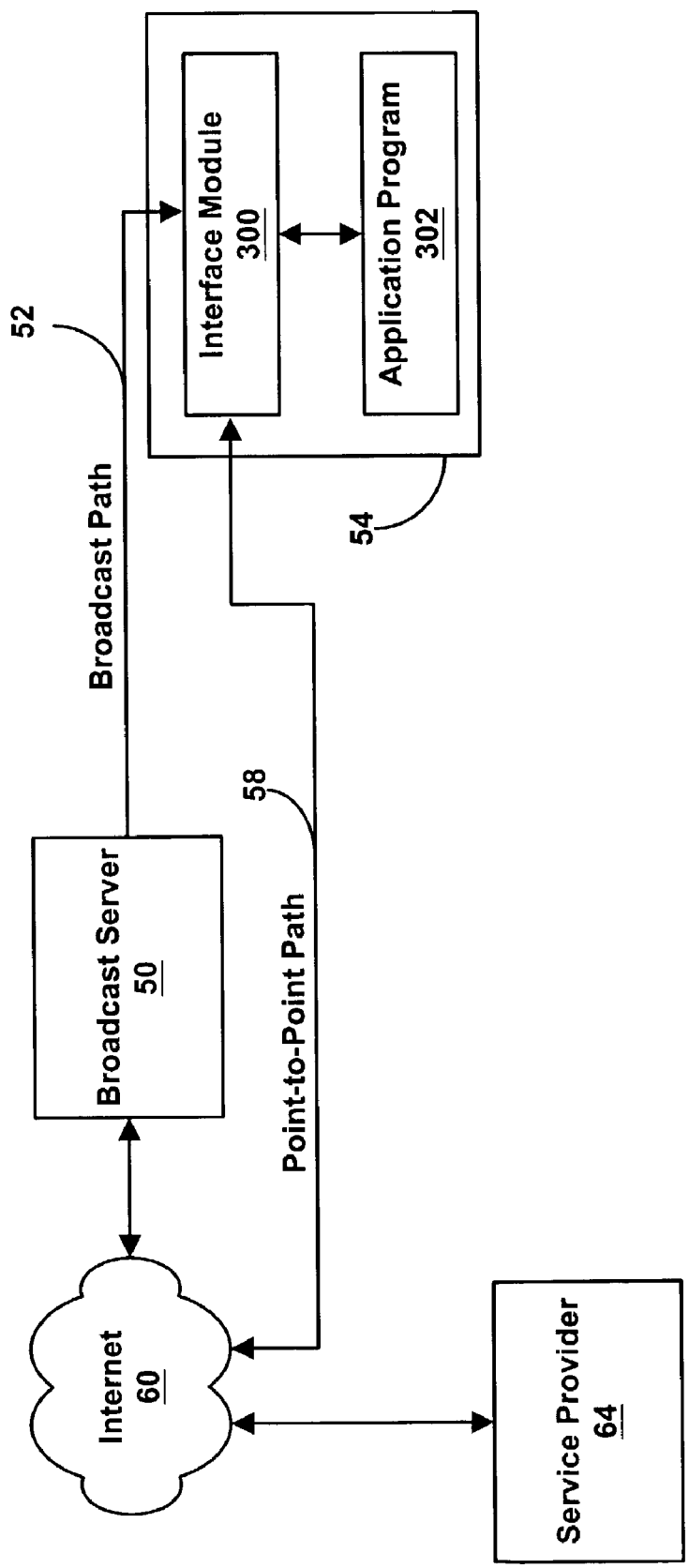
FIG. 7 shows a block diagram illustrating a interface module running on an interactive television receiver.

FIG. 7 shows a block diagram illustrating a interface module 300 that can be used in the interactive television receiver 54. The interface module can run on the interactive television receiver 54, and it can serve as an interface for an application program 302 requesting data from the interactive television system. The interface module 300 may receive a resource request from the application program 302. The interface module 300 may then decide whether to obtain the resource from the broadcast path 52 or from the point-to-point path 58. If the request is not already in a supported format, the interface module 300 may translate the request from the application program 302 into a format supported by the path used to obtain the resource.

The application program 302 can run on the interactive television receiver 54. The interactive television receiver 54 may run a interface module. The interface module can provide the application program 302 with the necessary application program interfaces ("APIs") to allow the application program 302 to fetch a resource from the carousel or from the point-to-point path 58. As is known in the art, an API can be a set of functions used by a program to communicate with another program, with the operating system or with other services.

The application program 302 could obtain data directly from the carousel by sending an appropriate request for data from the carousel. In response, the application program 302 could receive the requested data, which was sent in the carousel via the broadcast path 52. Alternatively, the application program 302 could obtain data by sending a request through the point-to-point path 58 to a service provider 64. Then, the service provider 64 may cause the data to be sent to the interactive television receiver 54 along the point-to-point path 58. However, the format for requesting data from the broadcast path 52 may differ from the format for requesting data from the point-to-point path 58.

The interface module 300 may run on the interactive television receiver 54 and serve as an interface between the application program 302 and the two data paths 52, 58. The interface module 300 may receive a data request from the application program 302 running on the interactive television receiver 54. The data request to the interface module 300 can be in a uniform format that may be used to request resource from either the broadcast path 52 or the point-to-point path 58. The interface module 300 can process the data request from the application program 302 to determine whether to obtain the data from the broadcast path 52 or from the point-to-point path 58. Then, if necessary, the interface module 300 can reformat the data request to the syntax required for either the broadcast path 52 or the point-to-point path 58.

Figure 8:
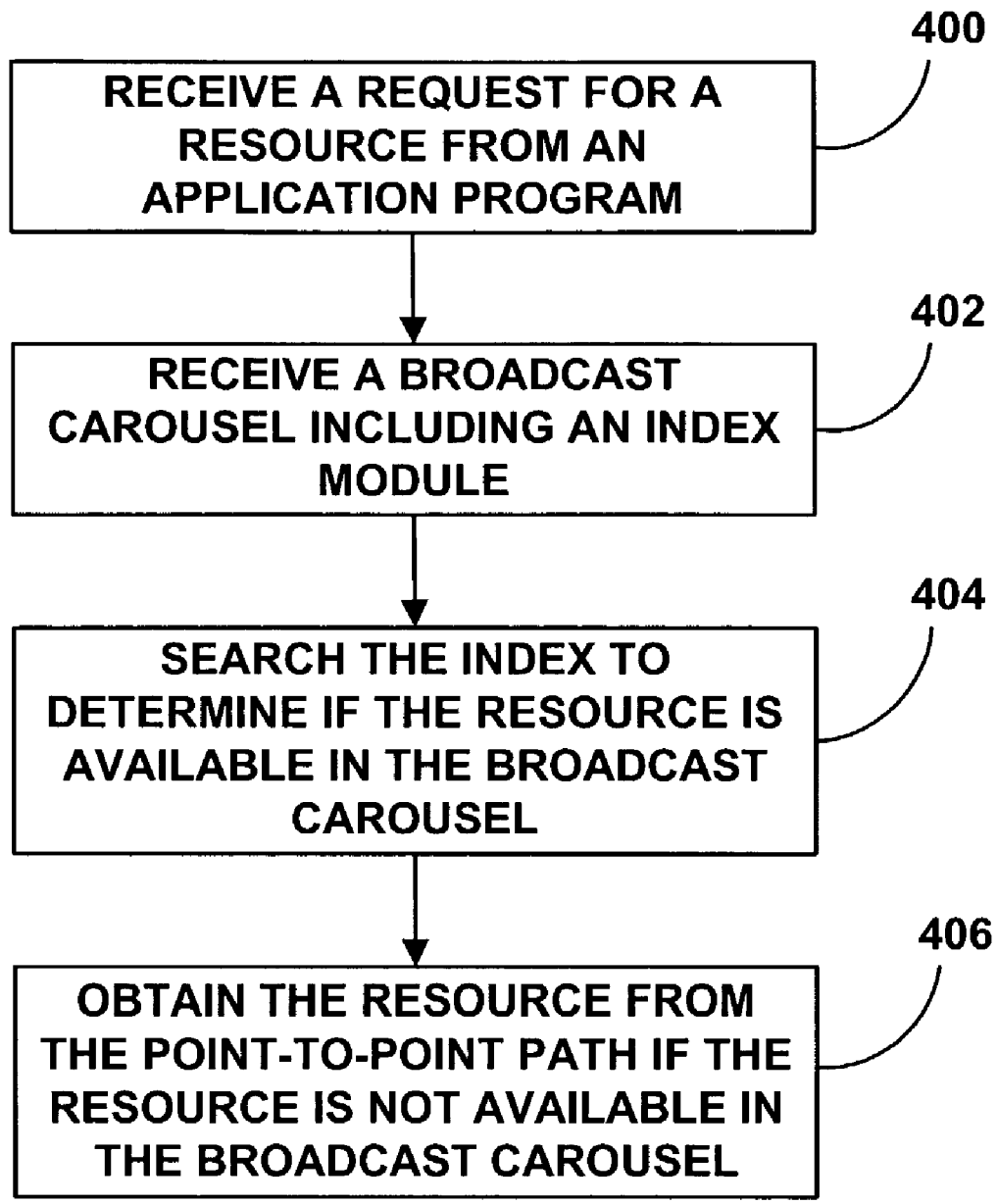
FIG. 8 is a flowchart of an exemplary process for obtaining a resource using the interface module of FIG. 7.

FIG. 8 is a flowchart of an exemplary process that can be used to obtain a resource. At Step 400, the interface module can receive a request for a resource from an application program. Then, at Step 402, the interface module can receive a broadcast carousel, which includes an index module. The interface module can then search the index module to determine if the resource is available in the broadcast carousel, shown at Step 404. If the resource is available in the broadcast carousel, it may be provided to the application program. If, however, the resource is not available in the broadcast carousel, then it may be obtained from the point-to-point path, shown at Step 406.

Figure 9:
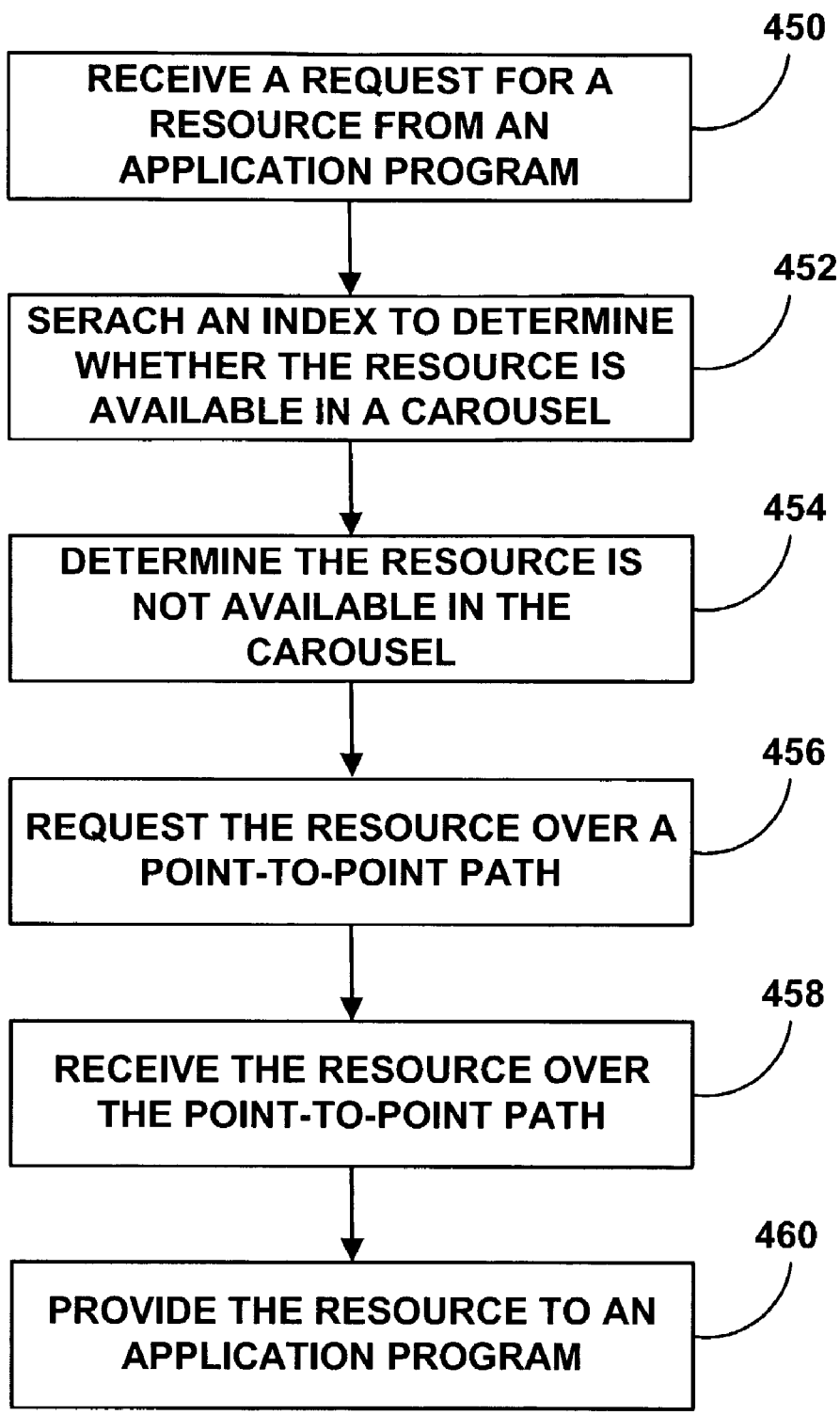
FIG. 9 is a flowchart of another exemplary process for obtaining a resource using the interface module of FIG. 7.

FIG. 9 is a flowchart of another exemplary process that can be used to obtain a resource. At Step 450, the interface module can receive a request for a resource from an application program. At Step 452, the interface module can search an index to determine whether the resource is available in the carousel. The index module may be transmitted to the interface module in the carousel. Then, at Step 454, the interface module determines that the resource is not available in the carousel. At Step 456, the interface module requests the resource from the point-to-point path. Then, At Step 458, the interface module receives the resource from the point-to-point path. Finally, the interface module provides the resource to the requesting application program, Shown at Step 460.

With continued reference to FIG. 7, the interface module 300 receives a resource request from the application program 302. The resource request may identify the resource by its URI or by another identifier. The request to the interface module 300 can be in a standard format, regardless of the source of the resource. In one embodiment, the data request is formatted using the syntax to obtain the resource from the broadcast path 52. In another embodiment, the data request is formatted using the syntax to obtain the resource from the point-to-point path 58. In yet another embodiment, the data request is formatted using another format understood by the interface module 300.

The interface module 300 receives the data request and determines which resource has been requested. Then, the interface module 300 can use the URI index 258 to determine whether that resource is available through the broadcast path 52. For example, the interface module 300 can search the URI index 258 based on the URI of the requested resource. If the resource is available on the broadcast path 52, the URI index 258 can provide a mapping between the resource's URI and its carousel address or its physical location. Then, using the mapping, the interface module 300 can obtain the resource from the carousel and provide it to the application program 302.

If, however, the URI index 258 does not store a mapping between the URI and a carousel address, then the interface module 300 may determine that the resource is not available on the broadcast path 52. Then, the interface module 300 can request the resource from the point-to-point path 58. In requesting the resource from the point-to-point path 58, the interface module 300 can use the protocol for requesting resource from that path. And, that protocol can differ from the protocol used for requesting resources from the broadcast path 52. Thus, once the interface module 300 determines which path to use in requesting the resource, the interface module 300 can use the appropriate protocol for that path.

The interface module 300 can provide a seamless way to obtain resources from either the broadcast path 52 or the point-to-point path 58. The application program 302 can request a resource using a uniform syntax, regardless of the origin of the resource. The use of the single syntax for requesting resources can provide several benefits. In one example of a benefit, the use of the single syntax may eliminate the need for an application developer to determine where a resource will be available. Since the application developer uses a uniform syntax to request resources, the application developer will not have to differentiate in the code between the possible sources of the resource. At the time of coding the application, it is not necessary to know whether the resource will be available through the broadcast path 52 or through the point-to-point path 58. When the application runs, the interface module 300 receives the resource request. If the resource is available on the broadcast path 52, the interface module 300 retrieves the resource from the carousel.

However, if the resource is not available on the broadcast path 52, the interface module 300 can obtain the resource through the point-to-point path 58 using a protocol for obtaining resources via the point-to-point path 58. Using the interface module 300 to allow a requested resource to be obtained from either the broadcast path 52 or the point-to-point 58 path can reduce program errors, which would occur by requesting a resource solely from a location where it is not available. The interface module 300 can also reduce needlessly using the point-to-point path 58 (e.g., where the application developer is not sure whether the resource will be available on the broadcast path 52 and chooses to obtain the resource from the point-to-point path 58) to obtain resources that would otherwise be available on the faster broadcast path 52.

In another example of a benefit, the interface module 300 can also allow the carousel to be continually updated without adversely affecting the application program 302. For example, an expired resource can be removed from the carousel. Without the interface module 300, removing a resource from the carousel may cause a program error, because the resource requested by the application program 302 would no longer be available on the broadcast path 52. The interface module 300, however, can handle converting the request from the broadcast syntax to the point-to-point syntax. The request for the removed resource is sent via the point-to-point path 58 and the current version of the resource is obtained from the point-to-point path 58. This provides the application program 302 with the current version of the resource instead of the expired version that was previously in the carousel.

The interface module 300 can also monitor the URI index 258 to detect changes in the carousel, such as when resources are added or removed from the carousel. In addition to monitoring the URI index 258, the interface module 300 could also monitor the supplemental URI index 258. The supplemental URI index 258 can reflect the changes to the carousel made after the creation of the original URI index 258, and it can provide the interface module 300 with a simple and efficient method for detecting changes to the carousel. Similarly, the interface module 300 could detect changes to the carousel by monitoring the carousel directory 256. Changes to the carousel could also be quickly and efficiently detected using the supplemental carousel directory.

In addition to handling resource requests, the interface module 300 can also support pre-fetching of resources. In one type of pre-fetching, the application program 302 may access a resource, such as an HTML page. The HTML page may comprise a variety of other sub-resources. While the application program 302 may currently access a portion of the sub-resources, the interface module 300 may pre-fetch the remainder of the sub-resources forming the HTML page. Then, if the application program 302 later attempts to access other sub-resources, the sub-resources are readily available without having to be requested from one of the transport paths.

In another type of pre-fetching, the HTML page may include links to various other resources. The interface module 300 may pre-fetch the linked resources, thereby obtaining the linked resources before they are requested by the application program 302. Once retrieved, the resources can be stored in the interactive television receiver's memory. Then, if the application program 302 requests one of the resources in memory, it can be retrieved from memory and provided to the application program 302. The resource can be provided to the application program 302 without having to take the time to retrieve the resource from one of the transmission paths.

In one exemplary embodiment, the interface module 300 only pre-fetches the linked resources that are available through the broadcast path 52. Since the broadcast server 50 periodically cycles through the carousel to send the resources to the interactive television receiver 54, and since no additional bandwidth would be used on the broadcast path 52 to obtain the resources, the interface module 300 can obtain those resources without slowing the data transmission rate on the broadcast path 52. This can also be done with only a minimal amount of extra processing by the interactive television receiver 54. If the application program 302 subsequently requests the resources via a link on the HTML page, the interface module 300 can quickly provide the pre-fetched resources without having to wait for the carousel to cycle through to the requested resources.

If the application program 302 does not request the pre-fetched resources, then they may be removed from memory. For example, if the application program 302 browses to a new HTML page, the interface module 300 can remove the pre-fetched resources from the old page. The interface module 300 may then pre-fetch resources for the new HTML page, and the newly pre-fetched resources may overwrite the pre-fetched resources for the old page. Other processes may also be used to remove unused pre-fetched resources.

In another exemplary embodiment, the interface module 300 may pre-fetch resources that are only available through the point-to-point path 58. The resources can be requested by the interface module 300, which then receives them over the point-to-point path 58. The resources can be stored by the interface module 300 in the interactive television receiver 54 and quickly retrieved if the application requests the resource via a link on the current HTML page. Since the resources would not be ordinarily sent over the point-to-point path 58, extra bandwidth is consumed in obtaining the resources over the point-to-point path 58. This may slow down the overall data transmission rate on the point-to-point path 58 and adversely affect other applications using that path. In yet another embodiment, the interface module may pre-fetch resources that are available over both the broadcast path 52 and the point-to-point path 58. Other variations are possible, and these may also be used.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments in hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for emulating a publishing server in a broadcast network, the method comprising:

receiving a request for a resource from an application program, wherein the application program executes on a television receiver;

receiving a broadcast signal via a broadcast path, the broadcast signal including data that identifies resources which are available via the broadcast, wherein the broadcast signal comprises a carousel of modules, and wherein the data that identifies resources which are available via the broadcast path comprises an index that maps one or more identified resources to a corresponding broadcast carousel;

accessing the data in response to receiving the request, and searching the accessed data to determine whether the requested resource is available via the broadcast path;

initiating retrieval of the resource via the broadcast path, in response to determining the resource is available via the broadcast path; and conveying a request for the resource via a point-to-point path, in response to determining the resource is not available via the broadcast path.

2. A computer readable medium having stored therein instructions for causing a central processing unit to execute the method of claim 1.

3. The method of claim 1, wherein the application program is configured to request resources which are obtainable via either the broadcast path or the point-to-point path using a uniform syntax.

4. The method of claim 3, wherein the uniform syntax is selected from the group consisting of:
a first syntax specifically formatted to obtain resources via the broadcast path using a first protocol;
a second syntax specifically formatted to obtain resources via the point-to-point path using a second protocol; and
a third syntax that is not specifically formatted to obtain resources via either the broadcast path or the point-to-point path.

5. The method of claim 4, wherein the uniform syntax is the first syntax, and wherein the method further comprises:
determining the requested resource is not available via the broadcast path;
converting the request for a resource to a request which utilizes the second protocol; and
conveying the converted request for the resource via the point-to-point path.

6. The method of claim 1, further comprising:
obtaining the resource from an HTTP server, an FTP server or a file server.

7. The method of claim 1, wherein the request identifies the resource using a URI, wherein a location of the resources in the carousel is identified using a physical address, and wherein the index provides a mapping between the URI and the physical address.

8. The method of claim 1, wherein the request identifies the resource using a URI, wherein the resource can be obtained from the carousel using a logical carousel address, wherein the index provides a mapping between the URI and the logical carousel address, and wherein obtaining the resource further comprises:
searching the index to determine the logical carousel address of the resource; and
obtaining the resource from the carousel using the logical carousel address.

9. The method of claim 8, wherein obtaining the resource from the carousel using the logical carousel address comprises:
searching a second index to determine a physical address for the resource, wherein the second index provides a mapping between the logical carousel address and the physical address; and
obtaining the resource from the carousel using the physical address.

10. The method of claim 1, wherein the resource is created using a hyperlink language.

11. The method of claim 10, wherein the hyperlink language is HTML, XHTML or WML.

12. The method of claim 10, wherein the resource includes at least one link identifying a second resource, the method further comprising:
pre-fetching the second resource.

13. The method of claim 1, wherein the broadcast network is a cable network, a satellite network or an interactive television network.

14. The method of claim 1, wherein the television receiver comprises a set-top box, a game console, a computer, or an interactive television receiver.

15. The method of claim 1, wherein the publishing server comprises an HTTP server.

16. An interactive television system comprising:
a broadcast server configured to convey a broadcast signal via a broadcast path;
a service provider configured to convey resources via a point-to-point path; and
a television receiver, wherein the television receiver is coupled to the broadcast server via the broadcast path and is coupled to the service provider via the point-to-point path;
wherein the television receiver is configured to:
receive data via the broadcast signal that identifies resources which are available via the broadcast path;
receive a request for a resource from an application program executing in the television receiver;
access the data in response to receiving the request, and search the accessed data to determine whether the requested resource is available via the broadcast path;
initiate retrieval of the resource via the broadcast path, in response to determining the resource is available via the broadcast path; and
convey a request for the resource via the point-to-point path, in response to determining the resource is not available via the broadcast path;
wherein the broadcast signal comprises a carousel of modules, and wherein the data that identifies resources which are available via the broadcast path comprises an index that maps one or more identified resources to a corresponding broadcast carousel.

17. The system of claim 16, wherein the application program is configured to request resources which are obtainable via either the broadcast path or the point-to-point path using a uniform syntax.

18. The system of claim 17, wherein the uniform syntax is selected from the group consisting of:
a first syntax specifically formatted to obtain resources via the broadcast path using a first protocol;
a second syntax specifically formatted to obtain resources via the point-to-point path using a second protocol; and
a third syntax that is not specifically formatted to obtain resources via either the broadcast path or the point-to-point path.

19. The system of claim 18, wherein the uniform syntax is the first syntax, and wherein the method further comprises:
determining the requested resource is not available via the broadcast path;
converting the request for a resource to a request which utilizes the second protocol; and
conveying the converted request for the resource to the service provider via the point-to-point path.

20. The system of claim 16, wherein requesting the resource over the point-to-point path comprises:
requesting the resource over the point-to-point path using a second protocol.

21. The system of claim 16, wherein the service provider stores a plurality of different representations of the resource, and wherein requesting the resource over the point-to-point path from the service provider comprises:
performing content negotiation with the service provider to select one of the plurality of representations.

22. The system of claim 16, wherein the television receiver comprises a set-top box, interactive television receiver, a computer, or a game console.

23. An interactive television receiver comprising:
a processor;
a data storage medium; and interface logic, wherein in response to receiving a request for a resource, the interface logic is configured to:

access data which identifies resources that are available via a broadcast path, wherein the data that identifies resources which are available via the broadcast path comprises an index that maps one or more identified resources to a corresponding broadcast carousel;

determine whether the requested resource is available via the broadcast path by searching the accessed data;

initiate retrieval of the resource via the broadcast path, in response to determining the resource is available via the broadcast path; and convey a request for the resource via a point-to-point path, in response to determining the resource is not available via the broadcast path.

24. The interactive television receiver of claim 23, wherein the request is generated within the television receiver.

25. The interactive television receiver of claim 24, wherein the request is generated by an application program configured to request resources which are obtainable via either the broadcast path or the point-to-point path using a uniform syntax.

* * * * *

UNITED STATES PATENT AND TRADEMARK OFFICE
CERTIFICATE OF CORRECTION

PATENT NO. : 7,065,780 B2  
APPLICATION NO. : 10/251603  
DATED : June 20, 2006  
INVENTOR(S) : Emmanuel Barbier and Alain Delpuch It is certified that error appears in the above-identified patent and that said Letters Patent is hereby corrected as shown below:

In the Title:
Item (54)
   Please change the title from "METHOD AND SYSTEM FOR EMULATING AND HTTP SERVER THROUGH A BRAODCAST CAROUSEL" to --METHOD AND SYSTEM FOR EMULATING AN HTTP SERVER THROUGH A BROADCAST CAROUSEL--.

Signed and Sealed this

Sixth Day of February, 2007

JON W. DUDAS  
*Director of the United States Patent and Trademark Office*